United States Patent
Wilson et al.

(10) Patent No.: US 6,480,949 B2
(45) Date of Patent: *Nov. 12, 2002

(54) DISK DRIVE BLOCK ORDERING SYSTEM

(75) Inventors: Aaron Wade Wilson, Berthoud; Brett Gerald Lammers, Longmont, both of CO (US)

(73) Assignee: STMicroelectronics N.V. (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,390
(22) Filed: Feb. 25, 1999

(65) Prior Publication Data

US 2001/0042166 A1 Nov. 15, 2001

Related U.S. Application Data

(60) Provisional application No. 60/076,323, filed on Feb. 27, 1998.

(51) Int. Cl.$^7$ .............................................. G06F 12/10
(52) U.S. Cl. ..................... 711/206; 711/221; 711/112
(58) Field of Search ........................... 711/4, 112, 113, 711/173, 102, 202, 205, 206, 207, 209, 203; 710/74; 707/200; 360/53, 48; 369/54

(56) References Cited

U.S. PATENT DOCUMENTS

| | | | | |
|---|---|---|---|---|
| 4,916,605 A | * | 4/1990 | Beardsley et al. | 701/18 |
| 5,367,652 A | * | 11/1994 | Golden et al. | 711/4 |
| 5,438,559 A | * | 8/1995 | Best et al. | 369/54 |
| 5,459,853 A | * | 10/1995 | Best et al. | 711/114 |
| 5,652,853 A | * | 7/1997 | Duvalsaint et al. | 711/203 |
| 5,822,142 A | * | 10/1998 | Hicken | 360/53 |
| 5,890,209 A | * | 3/1999 | Dobbek | 711/112 |
| 5,909,691 A | * | 6/1999 | Schultz et al. | 711/4 |
| 5,937,435 A | * | 8/1999 | Dobbek et al. | 711/202 |
| 5,983,309 A | * | 11/1999 | Atsatt et al. | 711/4 |
| 6,026,463 A | * | 2/2000 | Klein | 711/4 |
| 6,061,751 A | * | 5/2000 | Bruner et al. | 710/74 |
| 6,124,994 A | * | 9/2000 | Malone, Sr. | 360/48 |
| 6,181,497 B1 | * | 1/2001 | Malone, Sr. | 360/48 |
| 6,185,575 B1 | * | 2/2001 | Orcutt | 707/200 |
| 6,202,118 B1 | * | 3/2001 | Klein | 711/4 |

* cited by examiner

Primary Examiner—Matthew Kim
Assistant Examiner—Brian R. Peugh
(74) Attorney, Agent, or Firm—Lisa K. Jorgenson; William J. Kubida

(57) ABSTRACT

A method and system for laying out and accessing data in a disk drive system. The layout resides in a table in firmware of the disk drive system. The table includes multiple entries or rows, one corresponding to each different area in the disk media. The entry provides information about the range of block addresses in that area including the starting and end block address in the area, and information about the range of physical addresses including the head and the starting and ending cylinder number. A firmware routine finds the appropriate entry in the table and converts the block address to the physical address, or vice versa.

18 Claims, 4 Drawing Sheets

|  | BLOCK START | BLOCK END | CYLINDER (START) | CYLINDER (END) | HEAD |
|---|---|---|---|---|---|
| AREA 1 | 0 | 5000 | MINIMUM CYLINDER | HALFWAY CYLINDER | 1 |
| AREA 2 | 5001 | 10000 | HALFWAY CYLINDER | MAXIMUM CYLINDER | 0 |
| AREA 3 | 10001 | 15000 | MAXIMUM CYLINDER | HALFWAY CYLINDER | 1 |
| AREA 4 | 15001 | 20000 | HALFWAY CYLINDER | MINIMUM CYLINDER | 0 |

US 6,480,949 B2

DISK DRIVE BLOCK ORDERING SYSTEM

This application claims priority from United States Provisional Patent Application No. 60/076,323, filed on Feb. 27, 1998, the contents of which are incorporated herein by reference.

FIELD OF THE INVENTION

The present invention relates to the field of disk drives, and in particular, to a system for ordering or laying-out data blocks on a disk drive.

BACKGROUND OF THE INVENTION

Most personal computers include at least one disk drive system for storage of data. Typically, disk drive systems include one or more (e.g., three) disks or platters, generically referred to as the recording media. The platters are each connected in a spaced-apart fashion to a spindle that is employed to rotate or spin the platters. Typically, one read/write head is provided for each side or surface of each platter. The heads are mounted on actuators that can be moved radially relative to the platters.

Another major component of disk drive systems is the firmware that controls the disk drive. Disk drive firmware is the software that is embedded in the disk drive system and executes on a local disk controller processor(s), to direct overall drive operation. Typically, disk drive firmware is used to control at least: (1) the spinning of the disk drive spindle; (2) the movement of the actuator arms; and (3) the data path between the read/write heads and the host computer. The design of the firmware in a disk drive system is one of the major expenses in the design of the entire system.

One of the responsibilities of the firmware is to order the data on the media, which means to arrange the data on the media in an optimum way based on potentially many different factors. Some of the factors that may influence the optimum ordering of the data include, but are not limited to: (1) the amount of time it takes to perform a head switch operation (the operation of transitioning between reading or writing with one head to reading or writing with a different head); (2) the amount of time it takes to perform a cylinder switch operation (the operation of moving the actuator to position the read/write head at a different radial position relative to the media); (3) the sequential transfer rate desired from disk transfers; and (4) maximizing the readability of certain types of data For the purpose of data storage, the disk media is addressed using vectors that include, but are not limited to, the following: (1) cylinder, which corresponds to the radius on the media at which the data is located; (2) head, which corresponds to a particular side or surfaces of a particular platter on which the data is located; and (3) sector, which corresponds to the rotational position of the media at which the data is located.

This addressing is commonly referred to as the "physical" address of the data. The term "track" is used as a reference to the combination of a cylinder and head address. In other words, a particular cylinder can be found on each surface, but a track can only be found on one surface. For example, a disk drive with 1000 cylinders and 4 heads has 4000 tracks. The term "block" is used to describe the addressable resolution of the disk drive as presented to the host. A sector is the physical rotational position on a track where blocks of data can be stored (e.g., 500 sectors per track for a particular radial zone of the media). Most modern disk drives use 512 byte blocks and 512 byte sectors, so the terms are used interchangeably. However, some disk drives use a different block size and/or have a block size that does not match the sector size. A "block address" is thus a number representing the address of a block to the host computer. Sequential transfers to or from the host computer always go in the order of the block address.

When choosing to order sequential blocks on the media, the firmware designer can implement any one of the following methods:

(1) Surface mode, where sequential blocks on the disk drive include all sectors on the outermost track of a given surface, followed by all sectors on the next track at lesser radius of the same surface, and so on to the innermost track of the surface, followed by the outermost track of the next surface, and so on. This method minimizes head switch operations on sequential transfers because the majority of track switches do not involve a head switch, but it does require an actuator movement together with each head switch.

(2) Cylinder mode, where sequential blocks on the disk drive include all sectors of the outermost track of a given surface, followed by all sectors on the outermost track of the next surface, continuing through all outermost tracks of all surfaces, then proceeding to the next track at lesser radius of the original surface, and repeating the process through all of the tracks on the innermost cylinder. This method causes a higher percentage of track switches on sequential transfers to involve a head switch operation.

(3) Serpentined surface mode, which starts like surface mode, but then after transferring all sectors on the innermost track of the first surface, the ordering proceeds to the innermost track of the next surface and then proceeds in an outward direction. This method minimizes head switch operations, as with surface mode. In addition, it avoids the large actuator movement when proceeding from one surface to another.

(4) Serpentined cylinder mode, which starts like cylinder mode, but then after transferring all sectors on the outermost track of the last surface, the ordering proceeds to the next innermost cylinder but remains on the same surface. This method makes sure that a head switch and an actuator movement never occur on the same sequential track switch.

It is often advantageous to use combinations of the above modes, or to use modes different than those described. For example, the designer may choose to put some maintenance type information such as a defective sector list on the outer tracks of a drive in cylinder mode to make sure that copies are stored on multiple heads. Processing could then proceed with the user data in surface mode to match the block ordering with the performance characteristics of the servo system.

Furthermore, it is not unusual to have the starting or ending points at places other than the outermost or innermost circumference of the media. For example, the designer may choose to place the lowest numbered blocks near the center of the media, to maximize performance based on the operating characteristics of a given operating system. Or he may choose to have the first n blocks scattered around the media because they contain the defect list copies and it is important to minimize the possibility of the loss of the defect list due to debris on the media.

Therefore, although surface mode, cylinder mode, and serpentined versions of the same are general approaches that are commonly used, there are many cases in which it may be advantageous to place the data and order the sequential transfers in other ways, variations of these standard ways, and/or combinations of the above.

In most, if not all, prior art disk drive systems, the mode is hard-coded in firmware to create the layout or path followed through the media in the placement of sequential data. With the design of such systems, the firmware must be re-written from scratch if it is desired to create a different layout. This can add significantly to the design cost of such systems.

Since firmware development is a major cost component of the overall development of a disk drive, it is advantageous to re-use, or 'leverage' the firmware development effort on a particular disk drive product or model into other disk drive products or models. Often, the different operating characteristics, environmental conditions, and/or intended applications of different disk drive models causes the optimum block placement and ordering on the media to vary between the models. In existing systems, this can result in a great deal of additional firmware development effort to provide a calculation that is optimized for each disk drive model.

There exists a need for a method in which the relationship of block address to physical address of data on the media can be easily configured, thus allowing maximum reuse of firmware between disk drive models and reducing development time and cost. It is against this background, and the desire to solve the problems of and improve on the prior art, that the present invention has been developed.

SUMMARY OF THE INVENTION

The present invention relates to a method of accessing data on disk media in a disk drive system. The system has control circuitry with associated memory. The method includes providing a data layout table containing the layout of the data in a tabular form in the associated memory of the control circuitry. Upon external requests to access data in the disk drive system, the external request including a block address, the method includes converting the block address in the external request to a physical address by accessing the data layout table. The method also includes accessing the data on the disk media by utilizing the physical address.

The converting operation may include locating an entry in the data layout table and calculating a head number from the entry in the data layout table and the block address. The converting operation may also includes calculating a cylinder number from the entry in the data layout table and the block address and calculating a sector number from the entry in the data layout table and the block address. The calculating a cylinder number operation may include calculating a cylinder offset from the entry in the data layout table and the block address and calculating the cylinder number from the cylinder offset and a starting cylinder for the entry in the data layout table. The calculating a cylinder number may further include determining if a direction in the entry in the data layout table is forward or backward.

The present invention is also directed to a disk drive system for storing data. The system includes at least one storage disk, the disk having a storage surface thereon on which data can be stored. The system also includes at least one sensor operatively associated with the storage surface, the sensor generating signals representative of the data stored on the storage surface. Further, the system includes control circuitry associated with the storage disk and the sensor, the control circuitry including circuitry for determining where on the storage disk a particular segment of data is stored. The determining circuitry includes a table providing a layout of the data on the storage disk, the table being employed to determine where the particular segment of data is stored.

The table may include entries for corresponding areas of the storage surface. The table may include block addresses and physical addresses. The physical addresses may include head, cylinder, and sector information. The determining circuitry may convert between the block addresses and the physical addresses.

DETAILED DESCRIPTION OF THE PREFERRED EMBODIMENT

Figure 1:
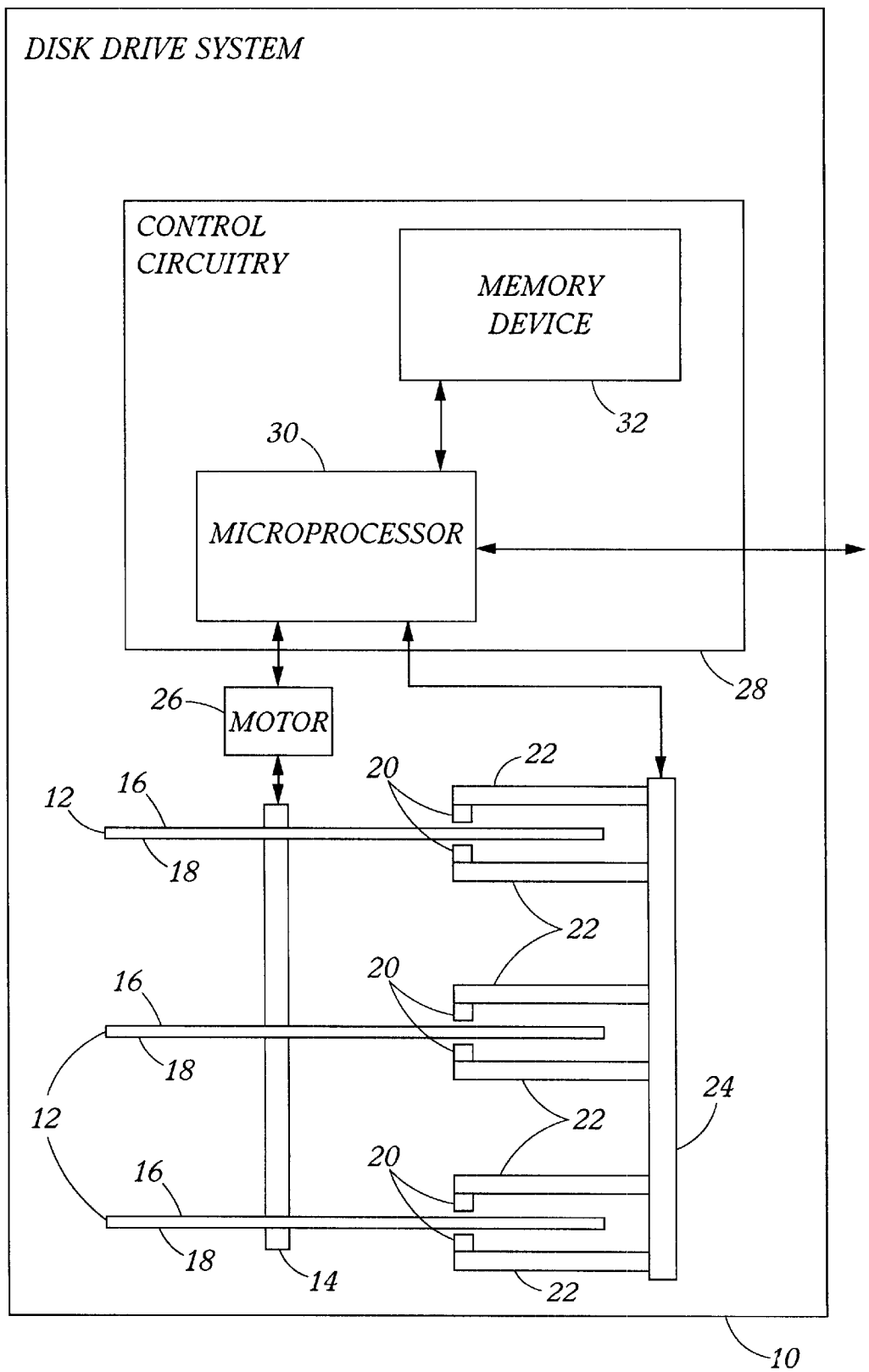
FIG. 1 is a simplified block diagram of a disk drive system of the present invention.

The present invention includes a block ordering system implemented in a disk drive system 10, shown in FIG. 1. The disk drive system 10 includes a plurality of platters 12 attached to a spindle 14. Each platter 12 has an upper surface 16 and a lower surface 18. Corresponding to each surface 16 and 18 is one of a plurality of read/write heads 20 supported by an arm 22 of an actuator 24. The platters 12 are spun via the spindle 14 by a motor 26. Control circuitry 28 controls the motor 26, the actuator 24, and the transfer of data to and from the read/write heads 20. The control circuitry 28 includes a microprocessor 30 having firmware associated therewith and stored in memory device 32.

Figure 2:
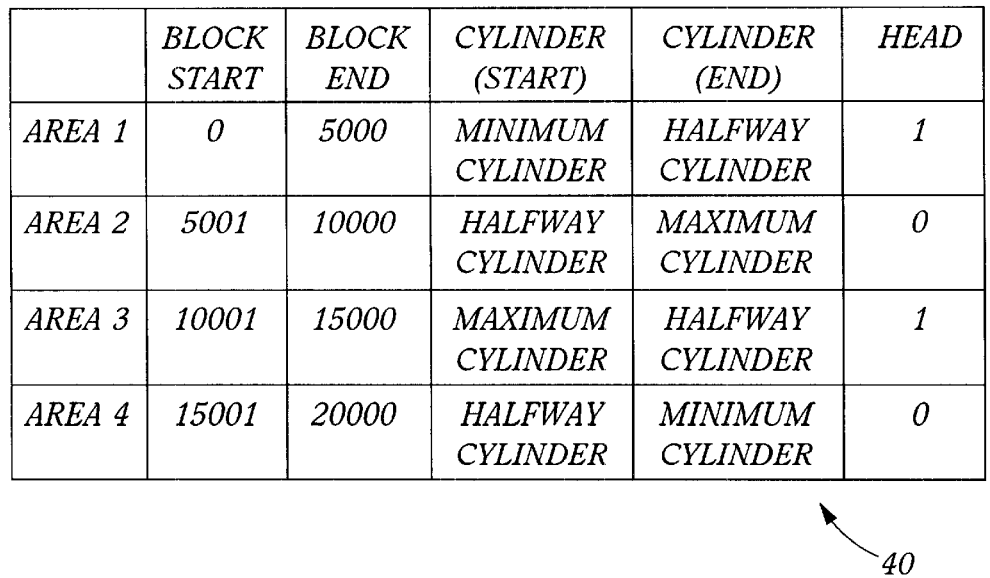
FIG. 2 is a table containing layout information representative of the table implemented in firmware in the disk drive system of FIG. 1.

Stored within the firmware associated with the microprocessor 30 is a table 40 (FIG. 2) that describes a layout 42 (FIG. 3) of data blocks on the media (platters). The layout 42 includes the path to be traversed by the read/write heads 20 in accessing sequential blocks of data for a host computer (not shown). This table 40 provides a mapping between logical block addresses and physical block addresses. In other words, the table 40 provides a definition of the mode to be employed in accessing data—be it surface mode, cylinder mode, a serpentined version of one of these modes, any combination of these modes, or some other mode.

The table 40 maps block ranges to track ranges. Each row in the table contains a block range and the track ranges that the block ranges map to. The table 40 contains an entry for every head switch, and could contain more entries up to one or more for every track. In addition to this mapping between the two types of addresses, each row will also contain the direction in which the entry will progress. The term "direction" describes how the head 20 progresses along the disk surface between the inner and outer diameter. When the direction is forward, then the head is traversing from outer diameter, or lower cylinder number, to the inner diameter, or higher cylinder number. When the direction is backwards, then the head is traversing from inner diameter to the outer diameter. The firmware 40 can access and use the table 40 to traverse the disk.

Figure 3:
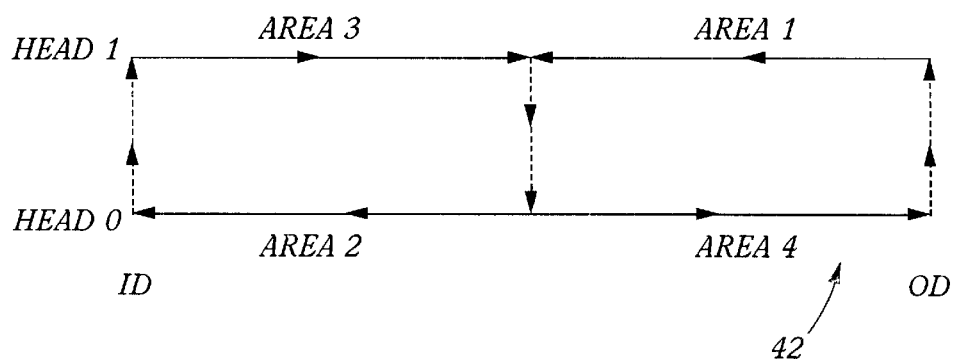
FIG. 3 is an pictorial example of the layout described in the table of FIG. 2.

For example, suppose the simplified layout 42 shown in FIG. 3 is to be employed for the disk drive system 10. The layout 42 begins at the outer diameter (OD), or Minimum Cylinder, of Head1 and proceeds forward on Head 1 to a point equidistant between the OD and the inner diameter (ID), called the Halfway Cylinder. The area described will be referred to as Area1. A head switch is next performed while staying on the same cylinder so that the layout continues now on Head0 while proceeding forward from the Halfway Cylinder to the ID, or Maximum Cylinder. This second area described will be referred to as Area2. A head switch is next performed while staying on the same cylinder so that the layout continues now on Head1 while proceeding backward from the Maximum Cylinder to the Halfway Cylinder. This third area described will be referred to as Area3. A head switch is next performed while staying on the same cylinder so that the layout continues now on Head0 while proceeding backward from the Halfway Cylinder to the Minimum Cylinder. This fourth area described will be referred to as Area4. As can be appreciated, the layout 42 follows a figure-8 pattern. Of course, many other patterns could be followed, this being only a simplified example to illustrate the invention.

The table 40 provides all of the information needed for the firmware to instruct the system 10 to follow this layout 42. As can be appreciated, the table 40 includes four rows, one for each of the areas (Area1, Area2, Area3, and Area4) in the layout 42 described above. Of course, other layouts may require many more rows in the table such as thirty or more, for example. The table 40 has columns for: (1) the first, or starting, logical block in the area; (2) the last, or ending, logical block in the area; (3) the first, or starting, cylinder in the area; (4) the last, or ending, cylinder in the area; and (5) the head corresponding to the area. Of course, the data could be provided in another format, or more columns could be provided to provide each of the starting and ending blocks in two words or segments of data such as a most significant word and a least significant word, for example.

The firmware in the disk drive system 10 can use the table 40 to correlate a block address to a cylinder/head/sector address. This can be done when it is desired to convert a block address to a physical address, or when it is desired to convert a physical address to a block address. The conversion of block address to a physical address is shown in the flow chart 100 of FIG. 4. A software or firmware routine can be written to follow this flow chart 100 to be used in interpreting or accessing the table 40. The flow chart 100 is seen to begin with two inputs that are provided to the process. First of all, the table 40 is provided (102), and also the block address is provided (104) for which a corresponding physical address is desired. Next, a step is performed (106) to find the line in the table 42 that contains the input block address. This is accomplished by searching the block addresses in the table 42 and finding the row where the input address is between the starting and ending block address. In other words, (starting block address)$\leq$(input block address)$\leq$(ending block address). A pointer for that row or line is passed on to the next step in the process.

Next, a test is performed (108) to determine if an existing line was found that satisfied the above condition. If not, then the routine outputs (110) an error message. If the line did exist, the next step is to calculate (112) the number of blocks into the given area to the input block address. In other words, an offset is calculated that is (block offset)=(input block address)−(starting block address). The block offset is then provided to the next step (114) where a calculation is made of the number of cylinders into the area. This cylinder offset is calculated from the block by the whole number portion of the quotient from block offset divided by the number of blocks per track. The number of blocks per track is known for each zone of the platters. This information can be stored in a separate table (not shown) or, alternatively, could be provided as an additional column in the table 40. For example, an outer zone of a platter may have 500 blocks per track, with the next inner-most zone of the platter having 450 blocks per track, and so forth. So (cylinder offset)=(block offset) DIV (blocks per track) provides the cylinder offset. The sector number is provided by the remainder from the calculation of block offset divided by blocks per track. This can be performed by the calculation of (sector number)=(block offset) MOD (blocks per track).

The head number from the table, the cylinder offset, and the sector number are provided from processing step (114) to a test (116) that is performed to determine whether in the area of interest, the direction is forward or backward. The direction is forward for a given row of the table 40 if the ending cylinder number is larger than the starting cylinder number. Thus, in the table 40, the direction is forward for the rows corresponding to Area1 and Area2, while the direction is backward for the rows corresponding to Area3 and Area4. In the case where the direction is forward, processing flows to step (118) where the precise cylinder number is calculated from the calculation of (cylinder)=(starting cylinder)+(cylinder offset). If the direction is not forward, then processing flows from test (116) to step (120) where the precise cylinder is calculated from (cylinder)=(starting cylinder)−(cylinder offset). After the precise cylinder has been calculated at either step (118) or step (120), processing flows to step (122) where the routine ends with the head number, the cylinder number, and the sector number calculated. In this manner, the block address has been converted to a physical address.

Figure 5:
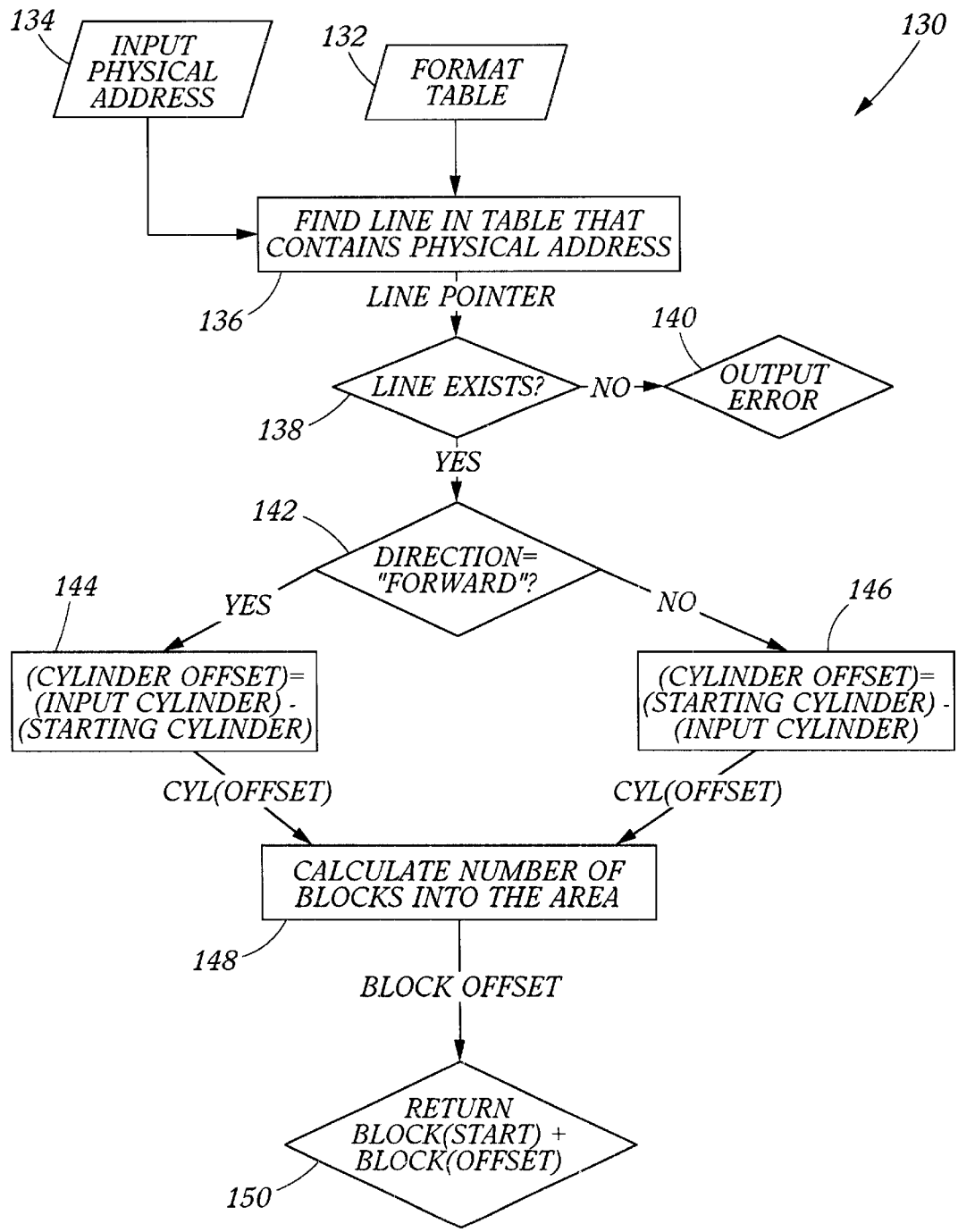
FIG. 5 is a flowchart of the process flow followed by firmware within control circuitry of the disk drive system of FIG. 1 in converting a physical address to a block address.

Occasionally, it is desirable to convert a physical address to the block address, such as during the performance of test procedures, and so forth. The process flow for performing this calculation is shown in a flow chart (130) in FIG. 5. Since the process of flow chart (130) is analogous to and the reverse of the process of flow chart 100, several of the details are very similar. First, two inputs are provided to the flow chart (130) in the form of the table 40 that is provided (132) and the desired input physical address (134) for which a corresponding block address is desired. Step (136) performs the function of finding the line or row in the table that contains the input physical address. This is done by searching through the cylinder ranges in the table and finding the line where the head number for that row matches the head number in the input physical address and, for forward directions, (starting cylinder)$\leq$(cylinder for the input physical address)$\leq$(ending cylinder), and for backwards directions, (starting cylinder)$\geq$(cylinder for the input physical address)$\geq$(ending cylinder). A pointer to this line or row in the table 40 is provided to the next step.

Figure 4:
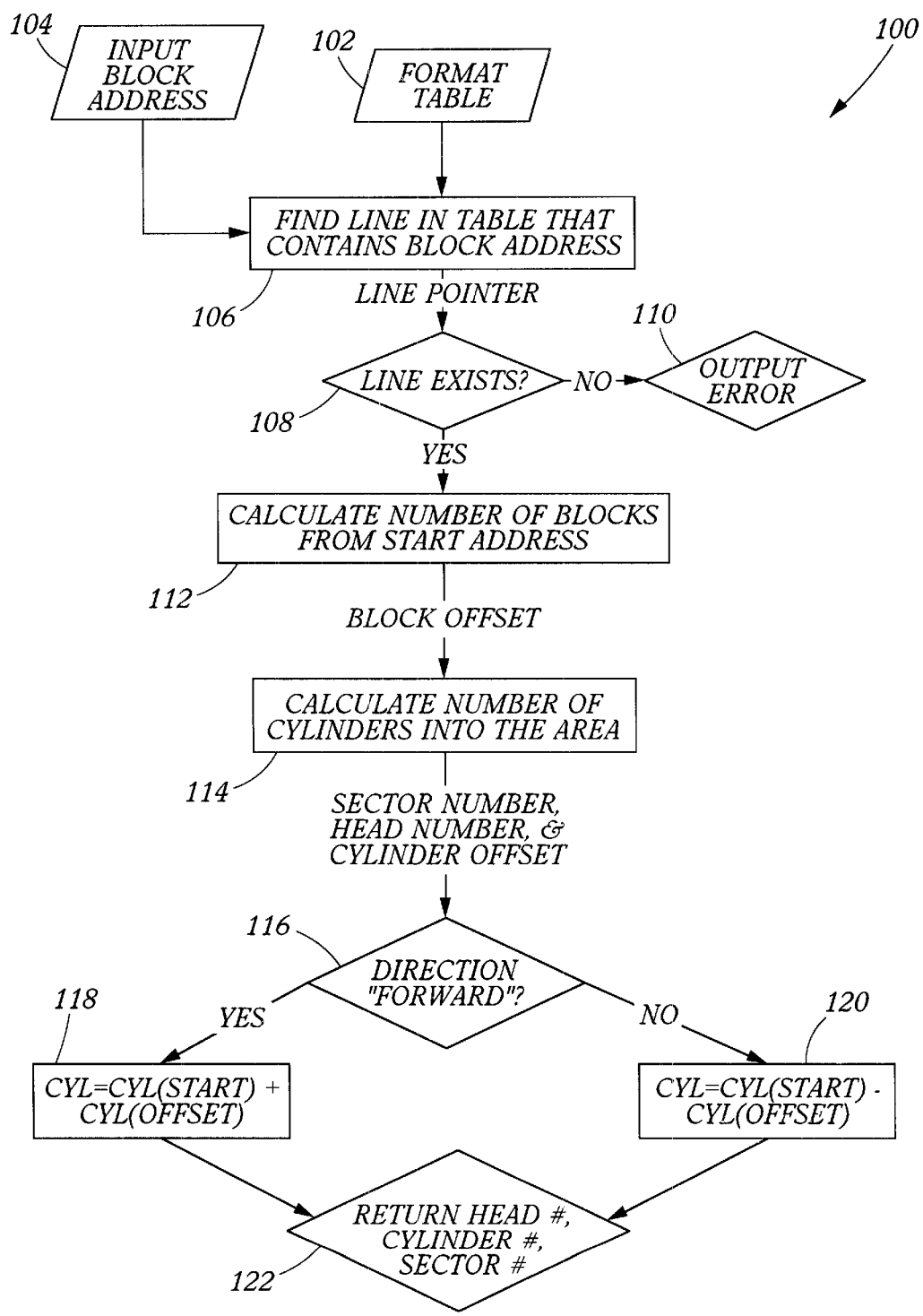
FIG. 4 is a flowchart of the process flow followed by firmware within control circuitry of the disk drive system of FIG. 1 in converting a block address to a physical address.

Next, a test is performed (138) to determine if there was an existing line in the table 40 corresponding to the input physical address. If not, an error message is output (140). If so, the process flows to a test (142) where it is determined if the direction for the selected row is forward or backwards. This test is performed in a similar fashion to the test (116) of flow chart 100 (FIG. 4). If the direction is forward, then a cylinder offset is calculated (144) by the equation (cylinder offset)=(input cylinder)−(starting cylinder). If the direction is not forward, then the cylinder offset is calculated by the calculation (146) of (cylinder offset)=(starting cylinder)−(input cylinder). In the case of either calculation (144) or (146), the cylinder offset is provided to the next processing step. Next, the number of blocks into the area is calculated (148). This calculation is performed using the cylinder offset and sector number from the input physical address. The block offset calculated is (block offset)=((blocks per track)× (cylinder offset))+(sector number). This step (148) then provides the block offset to the return step where the starting block and block offset are provided. The block address can then be calculated by adding the starting block to the block offset.

While the simplified table 40 and layout 42 do not show moving between areas in the middle of a track, this is also possible with the present invention. In such case, sector information could be added to the table 40 and additional processing added to the flow charts 100 and 130 to check for the sector to see which line or row of the table the desired address corresponds to.

As can be appreciated, the present invention provides several advantages for producers of disk drive systems. Most importantly, every time a system is being designed, it is not necessary to write code that is particular to the layout. Instead, a generic set of code can be written that can be used in several different designs. This code can access a table that can be easily changed for different layouts.

While the invention has been particularly shown and described with reference to a preferred embodiment thereof, it will be appreciated by those skilled in the art that various other changes in the form and details may be made without departing from the spirit and scope of the invention. It should be understood that this description has been made by way of example, and that the invention is defined by the scope of the following claims.

The invention claimed is:

1. A method of accessing data on disk media in a disk drive system, the system also having control circuitry with associated memory, the method comprising:
   storing layout data in the associated memory of the control circuitry, the layout data comprising data describing one or more layout areas defining a data access mode, wherein each layout area includes starting data indicating a starting point for the area and ending data indicating an ending point for the area;
   upon external requests to access data in the disk drive system, the external request including a physical block address, converting the physical block address in the external request to a physical address comprising head, cylinder, and sector address information by accessing the layout data; and
   accessing the data on the disk media by utilizing the physical address;
   wherein the layout data is provided in a data layout table and the converting operation includes:
      locating an entry in the data layout table;
      retrieving a head number from the entry in the data layout table using the physical block address;
      calculating a cylinder number from the entry in the data layout table and the physical block address; and
      calculating a sector number from the entry in the data layout table and physical block address.

2. A method as defined in claim 1, wherein the calculating a cylinder number operation includes:
   calculating a cylinder offset from the layout data and the physical block address; and
   calculating the cylinder number from the cylinder offset and a starting cylinder for the entry in the layout data.

3. A method as defined in claim 2, wherein the calculating a cylinder number further includes determining if a direction specified in the layout data is forward or backward, wherein the specified direction corresponds to a direction relative to the disk media.

4. A disk drive system for storing data, the system comprising:
   at least one storage disk, the disk having a storage surface thereon on which data can be stored;
   at least one sensor operatively associated with the storage surface, the sensor generating signals representative of the data stored on the storage surface;
   control circuitry associated with the storage disk and the sensor, the control circuitry including circuitry for determining where on the storage disk a particular segment of data is stored, wherein the determining circuitry includes layout data defining a data access mode on the storage disk, the layout data comprising data describing one or more layout areas, wherein each layout area includes starting data indicating a starting point for the area and ending data indicating an ending point for the area.

5. A disk drive system as defined in claim 4, wherein the data access mode is selected from the group consisting of a surface mode, a cylinder mode, a serpentined surface mode, a serpentined cylinder mode, and a combination mode.

6. A disk drive system as defined in claim 4, wherein the layout data includes entries for corresponding areas of the storage surface.

7. A disk drive system as defined in claim 6, wherein the determining circuitry converts between physical block addresses and addresses comprising cylinder, head, and sector information.

8. The disk drive system of claim 4, wherein the control circuitry includes computer readable program code devices configured to cause the control circuitry to access the layout data to cause the disk drive system to move the sensor relative to the disk with the data access mode.

9. The disk drive system of claim 8, wherein the layout data of the control circuitry is modifiable to alter the data access mode without modification of the computer readable program code.

10. A method of converting between physical block addresses and cylinder, head, and sector addresses in a disk drive system, the method comprising:
    creating a data layout table relating physical block addresses to cylinder, head, and sector addresses in the disk drive system, the table holding layout data comprising data describing one or more layout areas defining a data access mode, wherein each layout area includes starting data indicating a starting point for the area and ending data indicating an ending point for the area;
    upon the need to convert between physical block addresses and cylinder, head, and sector addresses, accessing the table to convert between a given one of the physical block and cylinder, head, and sector addresses and the other of the physical block and cylinder, head, and sector addresses; and
    supplying the converted address.

11. A method of accessing data on disk media in a disk drive system having control circuitry with associated memory, the method comprising:
    storing layout data in a data layout table in the associated memory of the control circuitry, the layout data comprising data describing one or more layout areas defining a data access mode, wherein each layout area includes starting data indicating a starting point for the area and ending data indicating an ending point for the area;

upon external requests to access data in the disk drive system, the external request including a physical block address, converting the physical block address in the external request to a physical address comprising head, cylinder, and sector address information by accessing the layout data, wherein the converting includes locating an entry in the data layout table; and accessing the data on the disk media by utilizing the physical address.

12. The method of claim 11, wherein the converting further includes retrieving a head number from the entry in the data layout table using the physical block address.

13. The method of claim 11, wherein the converting further includes:

calculating a cylinder number from the entry in the data layout table and the physical block address; and calculating a sector number from the entry in the data layout table and physical block address.

14. A method as defined in claim 13, wherein the calculating a cylinder number operation includes:

calculating a cylinder offset from the layout data and the physical block address; and calculating the cylinder number from the cylinder offset and a starting cylinder for the entry in the layout data.

15. A method as defined in claim 14, wherein the calculating a cylinder number further includes determining if a direction specified in the layout data is forward or backward, wherein the specified direction corresponds to a direction relative to the disk media.

16. A computer readable medium for use in accessing data on disk media in a disk drive system having control circuitry with associated memory, comprising:

computer readable program code devices configured to cause a computer to effect storing layout data in the associated memory of the control circuitry, the layout data comprising data describing one or more layout areas defining a data access mode, wherein each layout area includes starting data indicating a starting point for the area and ending data indicating an ending point for the area;

computer readable program code devices configured to cause a computer to effect upon external requests including a physical block address to access data in the disk drive system, converting the physical block address in the external request to a physical address comprising head, cylinder, and sector address information by accessing the layout data; and computer readable program code devices configured to cause a computer to effect accessing the data on the disk media by utilizing the physical address;

wherein the layout data is provided in a data layout table and the converting includes:

locating an entry in the data layout table;

retrieving a head number from the entry in the data layout table using the physical block address;

calculating a cylinder number from the entry in the data layout table and the physical block address; and calculating a sector number from the entry in the data layout table and physical block address.

17. The computer readable medium of claim 16, wherein the calculating a cylinder number includes calculating a cylinder offset from the layout data and the physical block address and calculating the cylinder number from the cylinder offset and a starting cylinder for the entry in the layout data.

18. A disk drive with enhanced data storage access, comprising:

means for creating a data layout table relating physical block addresses to cylinder, head, and sector addresses in the disk drive system, the table holding layout data comprising data describing one or more layout areas, wherein each layout area defining a data access mode includes starting data indicating a starting point for the area and ending data indicating an ending point for the area;

means for upon the need to convert between physical block addresses and cylinder, head, and sector addresses, accessing the table to convert between a given one of the physical block and cylinder, head, and sector addresses and the other of the physical block and cylinder, head, and sector addresses; and means for supplying the converted address.

* * * * *